US012321566B2

(12) United States Patent
Leon et al.

(10) Patent No.: US 12,321,566 B2
(45) Date of Patent: Jun. 3, 2025

(54) MESSAGE APPLICATION IMPROVEMENT FOR RECALLING ONE TO MANY PRIVATE CONVERSATIONS

(71) Applicant: Microsoft Technology Licensing, LLC, Redmond, WA (US)

(72) Inventors: Adam Leon, San Francisco, CA (US); Monique Yin, San Carlos, CA (US); David Golland, Oakland, CA (US); Felix Giguere Villegas, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 16/866,380

(22) Filed: May 4, 2020

(65) Prior Publication Data
US 2021/0342038 A1 Nov. 4, 2021

(51) Int. Cl.
*G06F 3/0482* (2013.01)
*G06F 16/903* (2019.01)
*G06N 20/00* (2019.01)
*H04L 51/52* (2022.01)

(52) U.S. Cl.
CPC ...... *G06F 3/0482* (2013.01); *G06F 16/90335* (2019.01); *G06N 20/00* (2019.01); *H04L 51/52* (2022.05)

(58) Field of Classification Search
CPC . G06F 3/0482; G06F 16/90335; G06N 20/00; H04L 51/32
USPC .......................................................... 715/752
See application file for complete search history.

(56) References Cited

U.S. PATENT DOCUMENTS

| | | | |
|---|---|---|---|
| 2006/0173961 A1* | 8/2006 | Turski | G06Q 10/107 709/206 |
| 2008/0071873 A1* | 3/2008 | Gross | H04L 51/48 709/206 |
| 2014/0046961 A1* | 2/2014 | Buchheit | G06F 16/248 707/748 |
| 2014/0108562 A1* | 4/2014 | Panzer | G06Q 10/10 709/204 |

(Continued)

OTHER PUBLICATIONS

IPCOM000257299D: "A System and Method to Suggest Context-Appropriate Names for @Mentions", Jan. 30, 2019. (Year: 2019).*

*Primary Examiner* — Hwei-Min Lu
(74) *Attorney, Agent, or Firm* — Cantor Colburn LLP; Renee D Brown

(57) ABSTRACT

Techniques for improving an interactive user interface of a messaging application by dynamically identifying a configurable number of top-ranked targets for a new message from a plurality of possible targets for the new message are disclosed. An interaction with the messaging application is detected. The interaction is determined to be indicative of an intent to identify a target for the new message from the plurality of possible targets for the new message. The identifying of the targets is performed by applying a matching algorithm to the one or more keywords. The matching algorithm blends a ranking of individual connections associated with the member with a ranking of group conversations associated with the member. Responsive to the detection of the interaction, a listing of identifiers associated with the targets is caused to be presented in a search results portion of the user interface.

20 Claims, 10 Drawing Sheets

(56) References Cited

U.S. PATENT DOCUMENTS

| | | | |
|---|---|---|---|
| 2014/0244619 A1* | 8/2014 | Doroshenko | G06F 16/3331 |
| | | | 707/769 |
| 2015/0347925 A1* | 12/2015 | Zeng | G06Q 30/0242 |
| | | | 709/206 |
| 2016/0063115 A1* | 3/2016 | Ayan | G06Q 50/01 |
| | | | 707/722 |
| 2016/0357761 A1* | 12/2016 | Siracusa | G06N 20/00 |
| 2017/0068906 A1* | 3/2017 | Korycki | G06N 20/00 |
| 2017/0201575 A1* | 7/2017 | Song | H04L 51/216 |
| 2017/0279919 A1* | 9/2017 | Tung | H04L 67/02 |
| 2018/0083905 A1* | 3/2018 | Jayaram | H04L 51/42 |
| 2018/0131660 A1* | 5/2018 | Lambert | G06Q 30/0202 |
| 2019/0102396 A1* | 4/2019 | Pan | H04L 51/52 |
| 2019/0155916 A1* | 5/2019 | Huang | G06F 16/9535 |

* cited by examiner

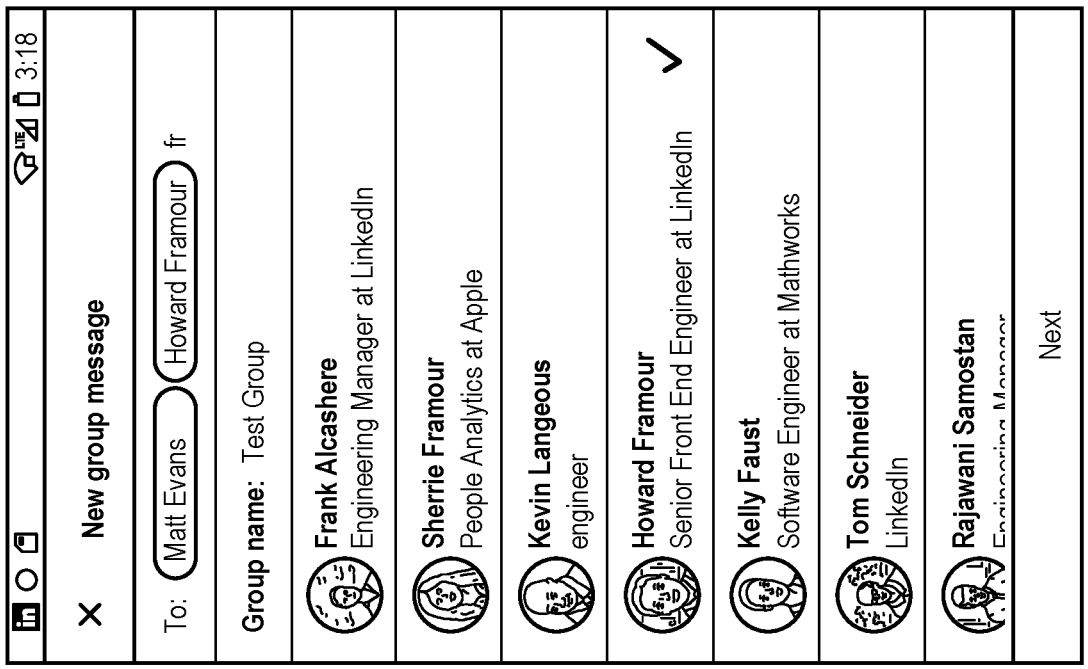
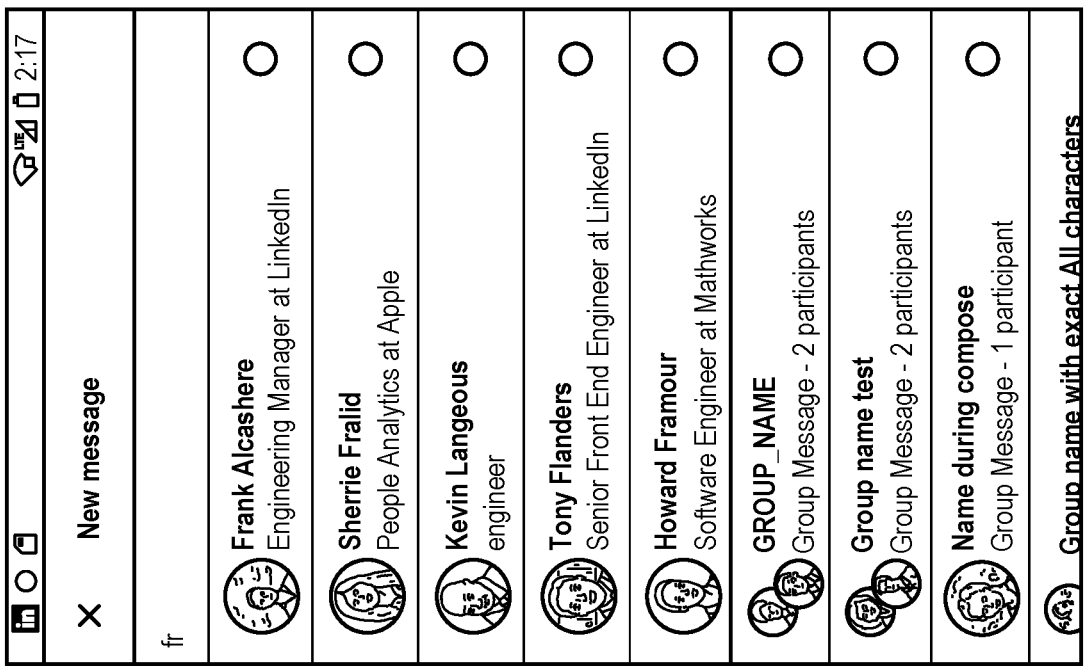
FIG. 6B
FIG. 6A

700

| | Pete Vergaise<br>Head of Growth Product | ○ |

| | Bob and David<br>Group Message - 2 participants | ○ |

| | Thomas Narmase<br>Staff Software Engineer at LinkedIn | ○ |

| | Normand Tandor<br>Leadership Recruiting at Business | ○ |

| | Sander Gauxes<br>Group Message - 2 participants | ○ |

| | Group name with exact 40 characters ...<br>Group Message - 2 participants | ○ |

| × | New message |

Matt|

🌐 Matthew Evans
   Software Engineer Manager at LinkedIn

 Introduction
Group Message - 6 participants

 Group with Matt and Avik
Group Message - 6 participants

 Group with Rustam and Matt
Group Message - 6 participants

 Project 🎨 🍷 🍸 🎭 ✈️
Group Message - 5 participants

 Introductions
Group Message - 5 participants

| × | New message |

Matt introducti|

 Introduction
Group Message - 6 participants

 Introductions
Group Message - 5 participants

FIG. 8B

MESSAGE APPLICATION IMPROVEMENT FOR RECALLING ONE TO MANY PRIVATE CONVERSATIONS

TECHNICAL FIELD

The present application relates generally to user interfaces for messaging applications and, in one specific example, to methods and systems of user interface enhancements for automatically and efficiently providing an anticipated selection of an individual recipient or a group of recipients for a message that is to be sent via a messaging application.

BACKGROUND

A social-networking system, such as LinkedIn, may support one or more messaging applications (e.g., for allowing members of the social-networking system to communicate with one another). As a social network of each particular member grows larger, it becomes harder to anticipate which other member or groups of members the particular member intends to communicate with next when engaging with a messaging application.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 6A is a screenshot of an example user interface of a messaging application.

FIG. 6B is a screenshot of an additional example user interface of a messaging application.

FIG. 7 is a screenshot of an example user interface in which one-on-one conversations with connections of the member are intermingled with group conversations.

FIGS. 8A and 8B are screenshots of an example user interface in which a top number of group conversations is narrowed down as the target for a new message in real time based on characters being entered into an input of the messaging application.

DETAILED DESCRIPTION

Figure 1:
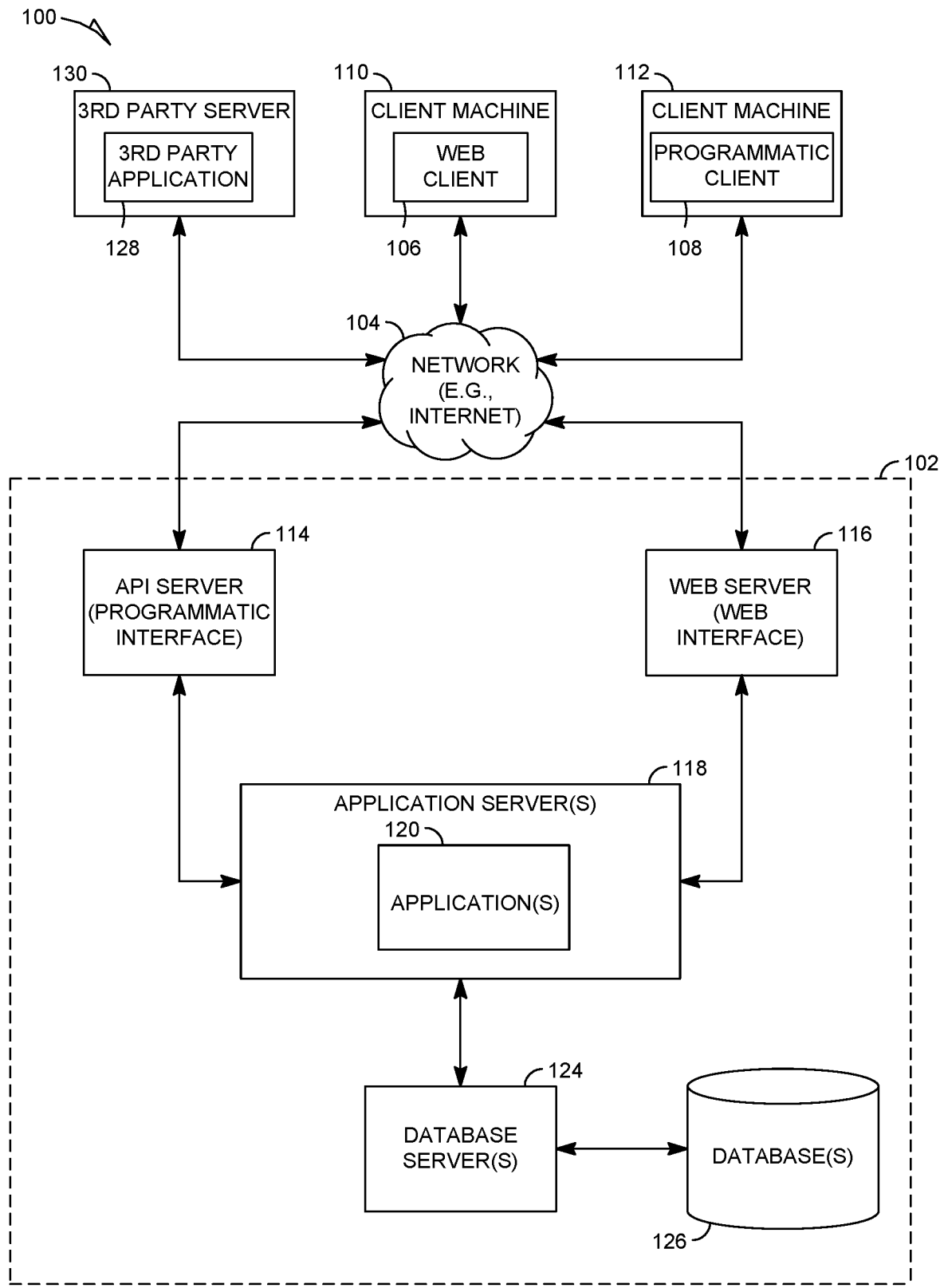
FIG. 1 is a block diagram illustrating a client-server system, in accordance with an example embodiment.

Example methods and systems of enhancing usability and electronic resource efficiency using anticipated-recipient-matching algorithms and specialized user interfaces are disclosed. In the following description, for purposes of explanation, numerous specific details are set forth in order to provide a thorough understanding of example embodiments. It will be evident, however, to one skilled in the art that the present embodiments may be practiced without these specific details.

Overview

In example embodiments, the disclosed improvements over prior art systems include improved display interfaces, including those for devices with small screens. The improvements allow users (e.g., members of a social networking system) to more quickly access desired data stored in one or more databases, such as data corresponding to a heterogenous mix of entities, such as conversations with individual contacts of the user and conversations with groups of other users of the social networking system, that the users have previously engaged in (e.g., for purposes of identifying a target for sending of a new message via a messaging system associated with the social networking system). In example embodiments, a limited list of a top number of likely, possible, and/or available targets is dynamically presented in an output portion of a user interface of a messaging application. In example embodiments, the top number of targets is subset of the possible targets that are ranked highest in a ranked list of the possible targets, the subset being of a predetermined or configurable size, or based on a transgressing of each of the top number of targets of a predetermined or configurable ranking threshold. In example embodiments, each of the top number of likely targets is selectable to initiate sending of a new message to the target. In example embodiments, the listing of the top number of targets is dynamically updated in response to inputs received (e.g., via an input user interface portion of the messaging application). In example embodiments, the dynamic updating is based on accessing or use of a Messenger Compose typeahead (TYAH) functionality of the messaging application (or another application associated with the messaging application that provides another point of entry for initiating sending of a new message using the messaging application). In example embodiments, each new input (e.g., such as a keystroke) causes a summary (e.g., a top number) of targets to be updated in real time (e.g., within an output portion of the messaging application user interface). In example embodiments, the improvements disclosed herein allow users to quickly navigate, directly within the messaging application (e.g., in substantially real-time, such as when invoking a functionality of a messaging application to send a new message or to specify recipients for a new message), potentially large networks (e.g., hundreds or thousands) of contacts (or connections) and groups of other users of the social networking system to identify a target for a new message. Thus, for example, users can identify a target without accessing or changing focus to one or more other applications (e.g., in order to identify different possible recipients or types of recipients). In example embodiments, one or more algorithms for ranking contacts and group conversations, and for blending the rankings, are used to identify the top number of possible targets based on inputs received and different types of possible targets (e.g., one-on-one messages and group conversations) are brought together within the output portion of the user interface for selection. In example embodiments, time of users is saved because, for example, the users do not have to navigate the different types of targets separately and/or because the most relevant, likely, and/or available targets are more quickly or efficiently identified and surfaced together within the user interface for selection.

DETAILED EMBODIMENT

In example embodiments, techniques for improving an interactive user interface of a messaging application by dynamically identifying a top number of targets for a new message from a plurality of possible targets for the new message are disclosed. An interaction with the messaging application is detected. The interaction is indicative of an intent to identify a target for the new message from the plurality of possible targets for the new message. The interaction includes a specification of one or more keywords associated with the target in a search portion of the user interface. The plurality of possible targets includes individual connections and group conversations associated with a member of the social networking system. The identifying of the top number of targets is performed by applying a matching algorithm to the one or more keywords. The matching algorithm blends a ranking of the individual connections of and/or contacts associated with the member with a ranking of the group conversations associated with the member. Responsive to the detection of the interaction, a listing of identifiers associated with the top number of targets is caused to be presented in a search results portion of the user interface. Each of the identifiers is selectable to cause a field to be presented in the user interface for entering the new message.

In example embodiments, one or more modules are specially designed (e.g., through one or more operations or algorithms, including computer programming logic, described herein) and incorporated into one or more memories of a networked system (e.g., via one or more computer-implemented deployment process) to specially configure one or more computer processors of the networked system to perform one or more of the operations or algorithms described herein.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device. In some embodiments, the networked system 102 may comprise functional components of a social networking service.

Figure 2:
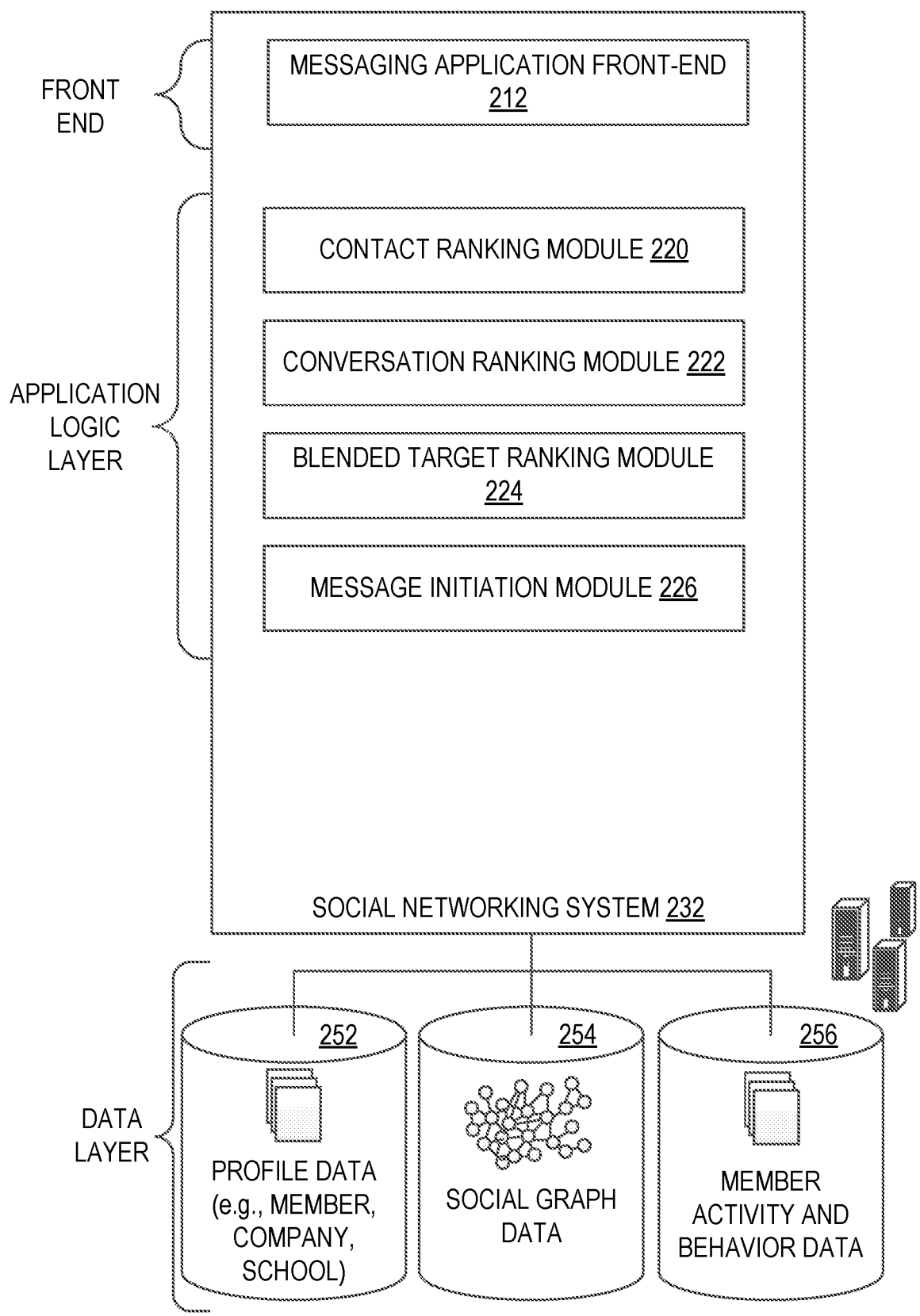
FIG. 2 is a block diagram showing the functional components of a social networking service within a networked system, in accordance with an example embodiment.

As shown in FIG. 2, front-end components, including a messaging front-end 212, may comprise a user interface module (e.g., a web server), which receives requests from various client-computing devices, and communicates appropriate responses to the requesting client devices. For example, the user interface module(s) may receive requests in the form of Hypertext Transfer Protocol (HTTP) requests, or other web-based, application programming interface (API) requests. Upon detecting a particular interaction, the front-end components may log the interaction, including the type of interaction and any meta-data relating to the interaction, in a member activity and behavior database 256.

An application logic layer may include one or more various application server modules, which, in conjunction with the user interface module(s), generate various user interfaces (e.g., web pages) with data retrieved from various data sources in the data layer. With some embodiments, application server modules are used to implement the functionality associated with various applications and/or services provided by the social networking service. In some example embodiments, the application logic layer includes execution of high-level scripting applications (e.g., Pig/Hadoop applications), execution of batch jobs (e.g., via one or more offline jobs, such as one or more Hadoop jobs), and so on.

In example embodiments, the application logic layer includes contact ranking module 220 configured to rank connections and/or contacts of a member of the social networking system with respect to a likelihood that the member intends to send a new message to one of the contacts, a conversation ranking module 222 configured to rank group conversations with respect to a likelihood that the member intends to a send a new message for inclusion in one of the group conversation, a blended target ranking module 224 for ranking targets (e.g., contacts and group conversations) by blending the rankings for the contacts and the group conversations, and a message initiation module

226 that is configured to cause presentation of a user interface field or widget for entering a new message that is to be communicated to one or more of the targets, as explained in more detail below.

As shown in FIG. 2, a data layer may include several databases, such as a database 252 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 252. Similarly, when a representative of an organization initially registers the organization with the social networking service, the representative may be prompted to provide certain information about the organization. This information may be stored, for example, in the database 252, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 254, and may be referred to as connections of or contacts associated with the members.

As members interact with the various applications, services, and content made available via the social networking system, the members' interactions and behavior (e.g., content viewed, links or buttons selected, messages responded to, etc.) may be tracked and information concerning the member's activities and behavior may be logged or stored, for example, as indicated in FIG. 2 by the database 256.

In some embodiments, databases 252, 254, and 256 may be incorporated into database(s) 126 in FIG. 1. However, other configurations are also within the scope of the present disclosure.

Although not shown, in some embodiments, the social networking system provides an application programming interface (API) module via which applications and services can access various data and services provided or maintained by the social networking service. Such applications may be browser-based applications, or may be operating system-specific. For example, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the front-end and back-end systems are referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
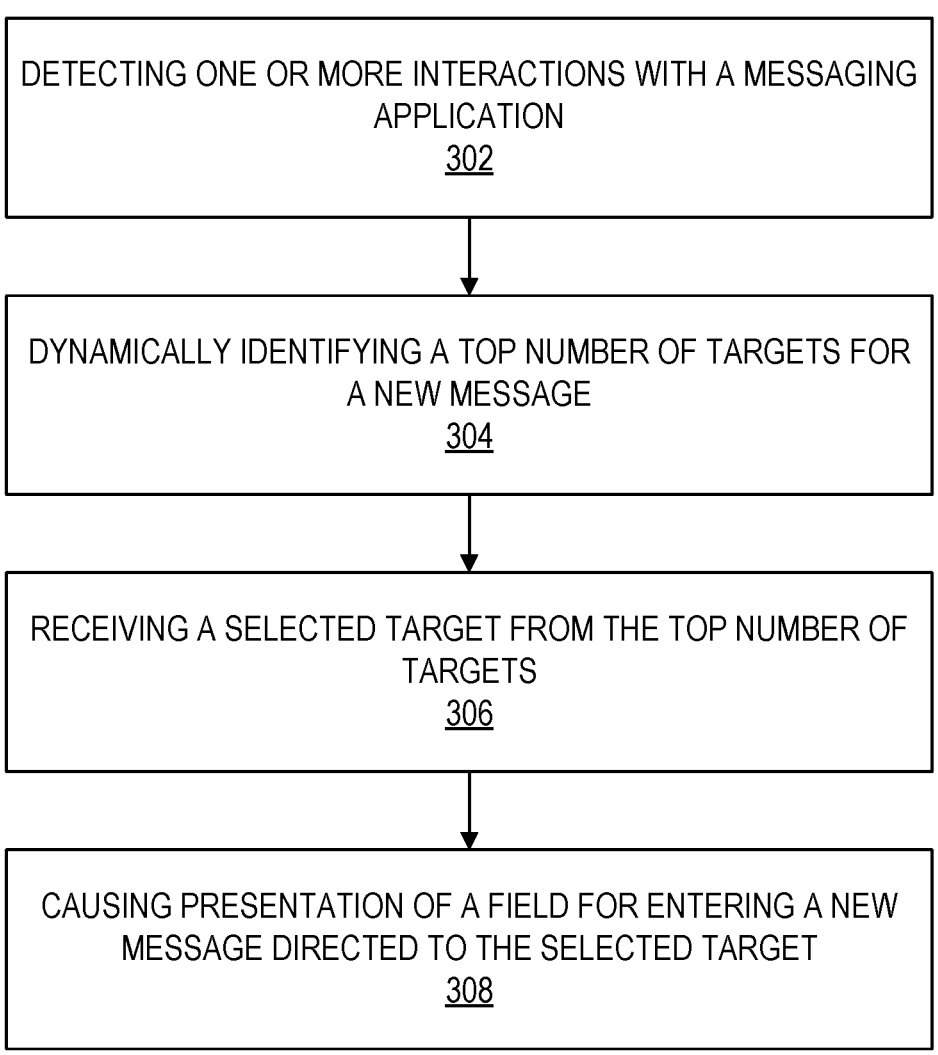
FIG. 3 is an example method of enhancing a user interface of a messaging application of the social networking system of FIG. 2.

FIG. 3 is an example method 300 of enhancing a user interface of a messaging application of the social networking system 232. In example embodiments, the operations are performed by one or more modules of the front end and/or application logic layer of the social networking system 232.

At operation 302, one or more interactions with a messaging application are detected that are indicative of an intention of a member to send a new message using the messaging application.

For example, it may be detected that a member has accessed a messaging application that is configured to receive a search query from a user for identifying a top number of targets (e.g., from contacts or group conversations of the member) for selection for sending a new message. Or it may be detected that a member is using an input portion of the messaging application (e.g., by typing one or more characters into a search box of a messaging application that uses a Messenger Compose typeahead (TYAH) functionality) or another entry point into the messaging application that indicates an intent to quickly start or resume a one-on-one conversation or a group conversation. Members of the social networking system may seek to rapidly navigate large networks of contacts or group conversations to find a target. Thus, a TYAH functionality of the messaging application may be enhanced to search a new type of freely message-able entity (e.g., group conversations) or merge multiple sources of freely message-able entities: connections (or contacts) and group conversations. In example embodiments, connections include one-on-one conversations between the member and another member of the social networking system. Group conversations may include conversations that are conversations that involve more than just one-one-one conversations, such as conversations between multiple members of the social networking system. In example embodiments, group conversations may comprise a small percentage of total conversations engaged in by a member, but may represent a source of high engagement with respect to the social networking system. Therefore, enhancing the user interface of the messaging application may include giving group conversations equal or near-equal representation in the conversation-retrieval and/or target-identification processes for new messages (e.g., through application of one or more ranking algorithms, as described in more detail below).

At operation 304, a top number of targets for the new message are dynamically identified. The top number of targets may include a combination of one or more contacts of the member and one or more group conversations (e.g., such as one or more group conversations that the user has previous received or contributed to). In example embodiments, the top number of targets are dynamically updated (e.g., responsive to user input in real time). For example, the top number of targets may be updated in response to a user entering a character or a query term into an input portion of the user interface of the messaging application. In example embodiments, the updating is based on application of one or more ranking algorithms to data pertaining to contacts of the member or group conversations associated with the member. In example embodiments, one or more of the ranking algorithms are machine-learned models that are trained with features derived from the data stored in the one or more databases of the social networking system. In example embodiments, the models are generated to optimize various metrics associated with improving the user interface of the messaging application, such as accuracy of label predictions, precision of the label predictions, time-to-click of a selection of a target, and click-through rate within the messaging application, as explained in more detail below.

At operation 306, a selection of a target is received from the top number of targets.

At operation 308, a field for entering a new message directed to the selected target is caused to be presented within the messaging user interface. Thus, a member may be able to quickly direct a new message to an intended recipient (e.g., with only one (or a small number of) interactions with the messaging application).

Figure 4:
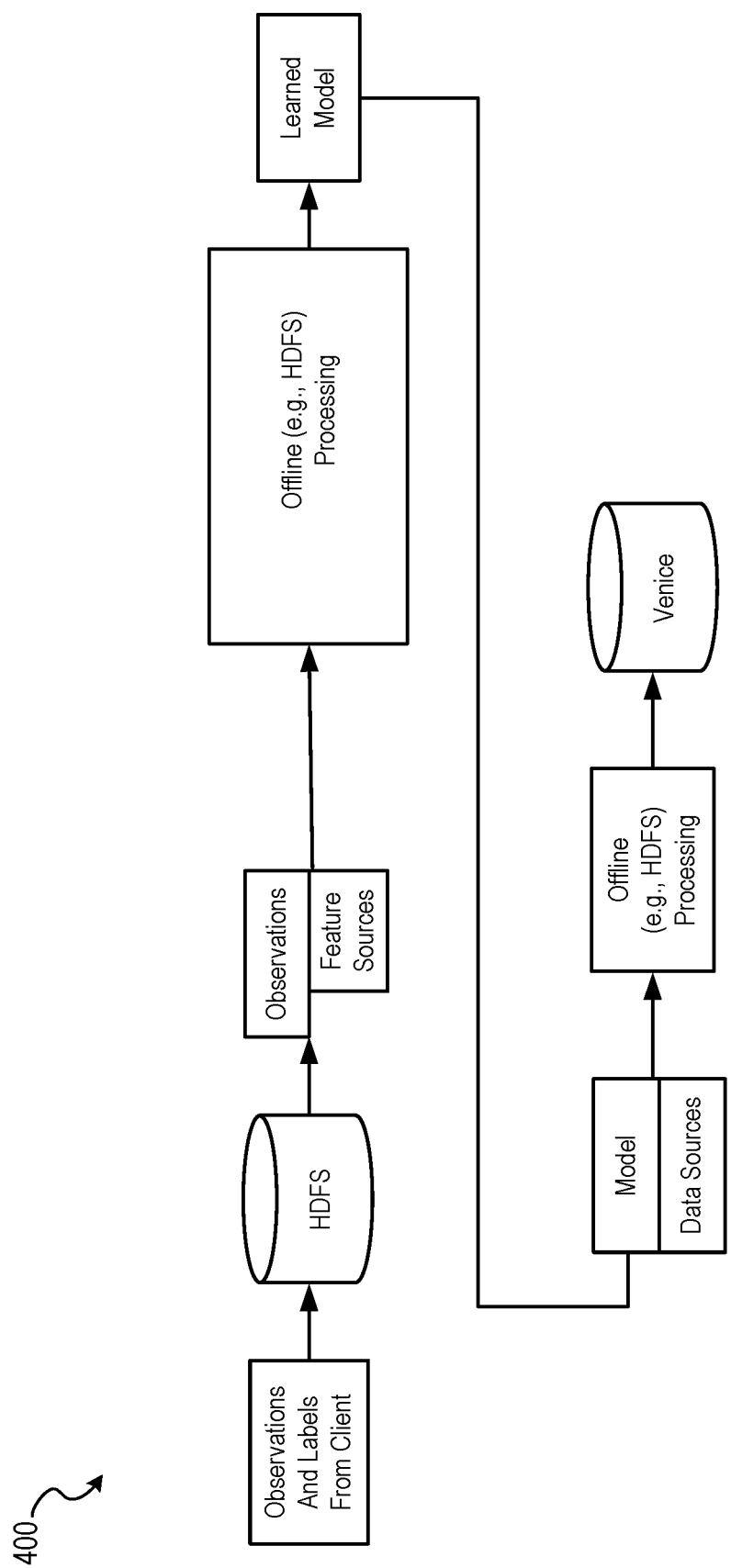
FIG. 4 is a block diagram illustrating an example architecture for an offline system for ranking connections and group conversations using a machine-learned model.

FIG. 4 is a block diagram illustrating an example architecture 400 for a system for ranking connections and group conversations using a machine-learned model. In example embodiments, group conversation participant names, conversation names, and/or other connection and conversation data or metadata (e.g. employer names or other profile data associated with members participating in a group conversation), are indexed (e.g., in a selected search vertical). In example embodiments, the system specializes in searching group conversation names and participant names at low latency. For group conversations (e.g., in typeahead), a user can query on the names of participants and the conversation name simultaneously. Group conversation search results are joined with the connections list (e.g., using a blending of rankings, as discussed in more detail below). In a simple case, a search input term "Srihari" may match one or more connections of the member and one or more group conversations associated with the member (e.g., in which the one or more connections are participants or in which a identifier (e.g., name or title) of the group conversation corresponds to the search input). An additional search input term or portion of an additional search input term (e.g., "introduction") may improve the specificity of the search, causing one or more matching group conversations to be ranked higher in a blended search output that includes both the potential contacts and potential group conversations that the member is searching for.

In example embodiments, the one or more ranking algorithms applied to perform the searching are not just based on a strength of a string match against one or more indexed documents (e.g., messages included in a one-on-one conversation or a group conversation or associated metadata). For example, such a basic, naïve approach may cause a long conversation name to be ranked below a short conversation name because there would be a higher percentage of characters matched in the shorter name. Furthermore, as members accumulate more group conversations that overlap with participants and group conversations names/identifiers, unengaged or irrelevant group conversations may bubble up in the results, making it harder for members to find the target they are looking for.

In example embodiments, a ranking model is built to rank documents returned by a search infrastructure corresponding to various metrics. Determining a likelihood of a click on an identifier corresponding to the group conversations is one example of a metric. Impression and Action events in TYAH may serve as the training, testing, and validating data. A number of features, described below, may be provided to a learning algorithm to determine the weight and contribution of each predictor toward the calculation of the score for each metric (e.g., click through). These values may be used to rank results (e.g., in descending order from highest likelihood to lowest).

Joining of a user interface input (e.g., TYAH) impression or action with a backend feature/served event may be facilitated by a tracking identifier (ID) generated on the backend and passed through an API to the client, thereby allowing UI elements to reuse this tracking ID when firing impression and action events. This flow permits the server and client knowledge to be joined. Feature data may be mined from messaging application data and data sources, (e.g., from the data layer depicted in FIG. 2), including member-member relationships e.g., member to member affinities), conversations views, message sent data (self and general activity), and so on. For example, features may include data items that correspond to impressions of conversation details and generic message send events. In example embodiments, member-to-member relationships may be mined from data items corresponding to network connection strength, connection strength, and so on. Temporal patterns in activity leading up to the time of click may be evaluated with time frames that capture recent and historical patterns of engagement leading up to the impression: e.g., 24 hours, 3 days, 1 week, or 1 year. Such features enable the model to make sense of the potential time-based value of member activity in the messaging application as it correlates to usage (e.g., TYAH usage).

For example, the learned model may discover that most recent messages are not an important predictor (e.g., because the member likely sees most recent conversations when accessing the messaging application (e.g., via a screen displaying recipient suggestions before getting to the messaging application user interface)). In example embodiments, it may be determined that pseudo-recent engagement is more positively predictive. The modelling process thus helps to make sense of this data (e.g., by assigning appropriate weightings to different features).

In example embodiments, key themes of signals (or features) may be used for modelling affinities of a member to group conversations. These themes may include personalized member engagement with group conversations (e.g., a member's conversation impressions and a number of a member's messages sent to the conversation, which may be temporal (e.g., over 24 hours or 3, 7, 30, or 100 days), member relationship with participants of the group conversations (e.g., number of participants, proportion of connections vs. non-connections of a member who are participants, strengths of connections of the members who are participants), general activity with respect to the group conversations (e.g., total count of messages (temporal) or age of thread), and a search context (e.g., what field was matched on, such as participant name vs. conversation name), classifying a matched member's activity in the group conversation (e.g., based on activity level of the matched member).

A participant relationships theme may include features for a proportion of overlap in past or current company, proportion of overlap in past or current school, and a non-connection classification (e.g., for relationships that are not direct connections). A context classification theme may include features for an entry point context, a client type (e.g., iOS, Android, web), a device type (e.g., mobile or desktop). Other features may include classifying the matched member's activities in the group conversations, a number of participants matched, connections strengths of each matched participant, and so on.

Metrics for determining a level of success of the model may include (1) Time to Click (TTC) for group conversations and total TTC for all possible entities/targets (e.g., both connections and group conversations); (2) Click Through Rate (CTR), and a configurable balance of CTR between connections and group conversations (here, it may be assumed that a low CTR is indicative of a bad user experience, such as a user leaving the messaging application to use other search tools; (3) distribution of click position (e.g., among ranked results), (4) impact on other messaging application metrics (e.g., number of messages sent or time spent using the messaging application). These metrics, as well as success thresholds associated with the metrics, feature inputs, and model parameters associated with the machine-learning process, may be defined, selected, and configured (e.g., via an administrative user interface).

Figure 5:
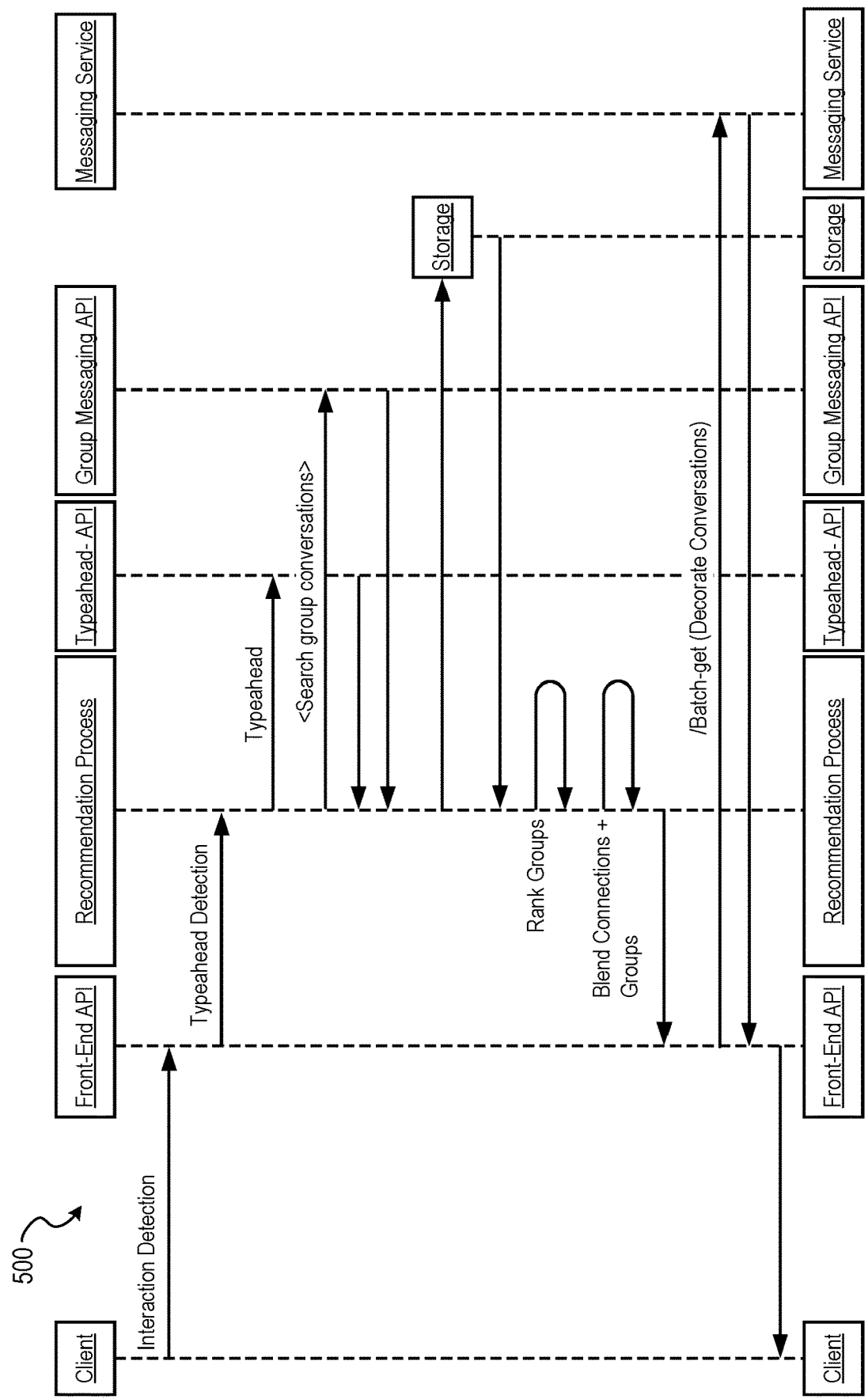
FIG. 5 is a block diagram illustrating an example online systems design for supporting the user interface enhancement described herein.

In example embodiments, rankings are precalculated from a learned model, using current tracking data collected in a daily (e.g., via one or more Hadoop process flows) and pushed to a data store (e.g., an in-memory "key-value" store, such as the data store depicted in FIG. 5) for rapid online access. Thus, lengthy online calculations are avoided so results can be rendered as fast as possible.

User interface (e.g., TYAH) impression and action events (observations) are emitted from a client into a distributed file system (e.g., a Hadoop Distributed File System or "HDFS"). Observations and feature sources are linked into a model definition (e.g., via a specialized process). A modelling process may provide configurations to train on features and observations, producing and storing a machine-learned model. The daily flow re-uses the learned model and pushes predictions based on the most current data.

In example embodiments, rankings are computed periodically in an offline flow (e.g., every hour, every two hours, twice per day, or once per day) via a scheduled ranking (e.g., performed via one or more offline processes, such as one or more Hadoop processes). If the jobs are heavy, involving significant computing resources (e.g., based on an amount of data needing to be processed transgressing a threshold amount) or are scheduled to be run when resources are limited (based on a monitoring of available system resources), long-term numbers may be computed in a first time interval (e.g., once per day) and a lightweight mini job may be run more frequently. The mini-job may union and add to any counts calculated since the last job and rebuild rankings based on the union. Alternatively, if the entire computation is amenable to stream processing, then both the full and mini-job may be replaced by a nearline stream processing system (e.g. Apache Samza) that emits the rankings to the storage system after asynchronously reacting to a triggering signal (e.g., a new group conversation getting created).

FIG. 5 is a block diagram illustrating an example online systems design 500 for supporting the user interface enhancement described herein. In example embodiments, an API serves the front end and makes function calls (e.g., to Recommendation Process) to retrieve ranked and blended results corresponding to interactions (e.g., TYAH) with the user interface of the messaging application. In example embodiments, the goal the online system is to retrieve search results and rank, with little online cost in the ranking process. Therefore, for the ranking stage, the online system refers to a data store with precalculated scores for ranking. In example embodiments, the data store provides reads with high throughput and low latency; it is a highly available, eventually-consistent, distributed key-value storage system.

In example embodiments, as depicted in FIG. 5, the client detects an interaction with a messaging application, calling a front-end API with information pertaining to the interaction. Based on an analysis of the information pertaining to the interaction, the front-end API detects that the interaction is a typeahead interaction. In response, the front-end API calls a Recommendation Process for performing the blended ranking. The Recommendation Process may call one or more additional APIs, including a Typeahead API and a Group Messaging API. In example embodiments, the Typeahead API facilitates a dynamic search of one or more data sources, including group conversations of a member associated with the client device (e.g., via the Group Messaging API) and one-to-one conversations associated with the member (e.g., via a One-to-One Messaging API, not pictured). The dynamic search may be updated across one or more data sources each time a new input is received (e.g., via an input user interface element of the messaging application). In example embodiments, one or more possible targets for a new message may be identified based on the searching of the one or more data sources and accessing of a preconfigured data store, such a key-value data store, for quickly determining matches across the one or more data sources in real-time. In example embodiments, the Recommendation Process ranks targets (e.g., group conversations and/or one-to-one conversations) and/or blends the rankings of different types of targets associated with a searching member, as described herein. Upon receiving the ranked and blended targets, the front-end application may query the messaging service for one or more decorations to associated with the targets, such as one or more photos from one or member profiles of one or more participants associated with one or more of the targets.

FIG. 6A is a screenshot 600 of an example user interface of a messaging application. In an input (e.g., first) portion of the user interface, the user can type one or more characters or phrases to identify a target for a new message. For example, as shown in FIG. 6A, the characters "fr" have been typed into the input portion. However, even before any characters are entered into this input portion, a suggestion of a top number of recipients is caused to be presented in an output (e.g., second) portion of the user interface (e.g., based on the blending of rankings of different types of targets performed by a machine-learned model). As characters or terms are entered into the input portion, the output portion is updated in real time. In example embodiments, connections are highlighted in a first region of the output portion and group conversations are specified in a second region of the output portion. For example, as shown in FIG. 6A, the first region of the output portion includes names of connections of the member (e.g., the portion of the listing ending in "Howard Framour") and a second region of the output portion has names of group conversations (e.g., the portion of the listing starting with "GROUP_NAME").

FIG. 6B is a screenshot 650 of an additional example user interface of a messaging application. Information pertaining to a new group message may be automatically input into various fields of a new group message user interface, including the To: field, based on a selection of one of a top number of group conversations that were previously selected (e.g., in the user interface of FIG. 6A. Here, a top number of ranked connections may be presented for adding to the group message. A clicking of a user interface element (e.g., a "Next") button may cause a user interface field to be presented for sending the group message to the selected targets.

FIG. 7 is a screenshot 700 of an example user interface in which one-on-one conversations with connections of the member are intermingled with group conversations that are identified as being particular relevant to the member (e.g., based on application of a machine-learned algorithm for blending the rankings of group conversations and connections of the member). For example, the output region may include a listing of potential targets. The listing may include an identification of a connection in the first slot, an identification of a four-member group conversation in a second slot, two more connections identified in slots three and four, and two more group conversations identified slots five and six. The order of the list may be based the blended ranking techniques described herein. In example embodiments, one or more graphical indicators (or decorations) are provided in conjunction with each target in the list. The graphical indicators may be indicative of a number of people involved in each conversation. In example embodiments, the graphical indicators may include photos (e.g., taken from member profiles) of one or more members involved in each conversation. In example embodiments, for a group conversation, the graphical indicators may be a selected subset of a plurality of graphical indicators corresponding to members involved in each conversation. In example embodiments, the selection is based on a connection strength of the member with respect to particular members participating in the group conversation. Thus, for example, two member profile photos may be selected as representative of a group conversation having participation from additional members, wherein the two member profiles are members having a particular strength to the member performing the search for a target conversation. In example embodiments, one or more numerical indicators may be included in the one or more graphical indicators (e.g., to specify a total number of members are invited to participate or have actually participated in the group conversation or a total number of connections of the searching member who are invited to participate or who have actually participated in the group conversation).

FIGS. 8A and 8B are screenshots 800 and 850 respectively of an example user interface in which a top number of group conversations is narrowed down as the targets for a new message in real time based on characters entered into an input of the messaging application and an application of a machine-learned model for generating blended rankings of connections and group conversations, as described herein. As depicted, as the searching member enters a series of characters, a name (e.g., "Matt") is identified as corresponding to individual connections of the searching member (e.g., "Matthew Murrell") as well as group conversations corresponding to the identified characters (e.g., group conversations in which a member named Matt is a participant or even in which a person named Matt is mentioned within the messages included in the group conversation). As the user enters more characters (e.g., "introducti"), the output is further narrowed down in real-time, causing connections to drop of the list and bringing particularly relevant group conversations to the top of the output portion of the user interface, including two group conversations having a title that corresponds to the characters entered so far by the member. In example embodiments, as depicted, graphical indicators for each possible target may include a combination of profile photos and numerical indicators, such as one or more profile photos of members that are engaged in a group conversation and have a connection strength to the member that transgresses a threshold connection strength, and a number indicating additional members of the social network (beyond those pictured) that are engaged in the group conversation.

Example Mobile Device

Figure 9:
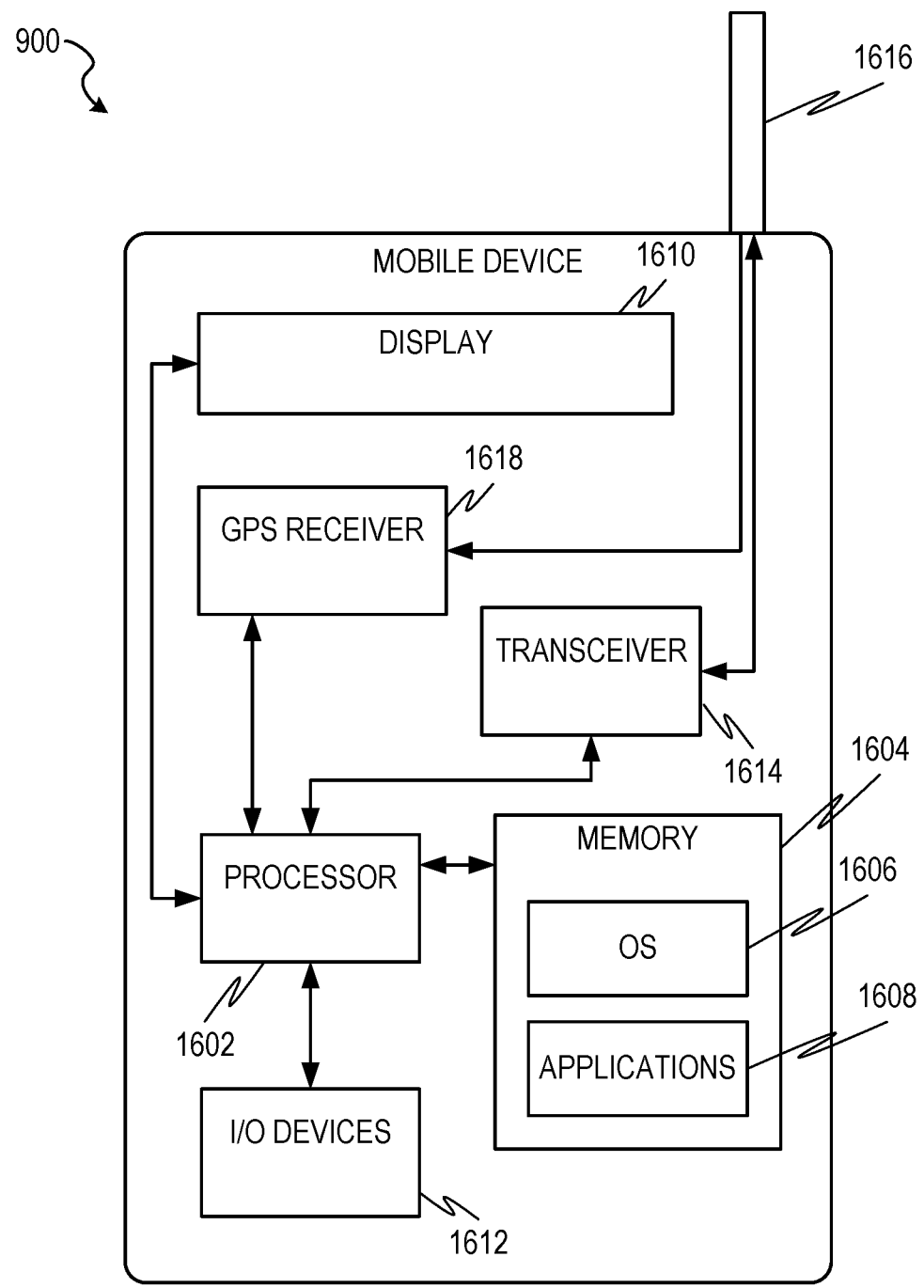
FIG. 9 is a block diagram illustrating a mobile device, according to an example embodiment.

FIG. 9 is a block diagram illustrating a mobile device 900, according to an example embodiment. The mobile device 900 can include a processor 1602. The processor 1602 can be any of a variety of different types of commercially available processors suitable for mobile devices (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 900. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
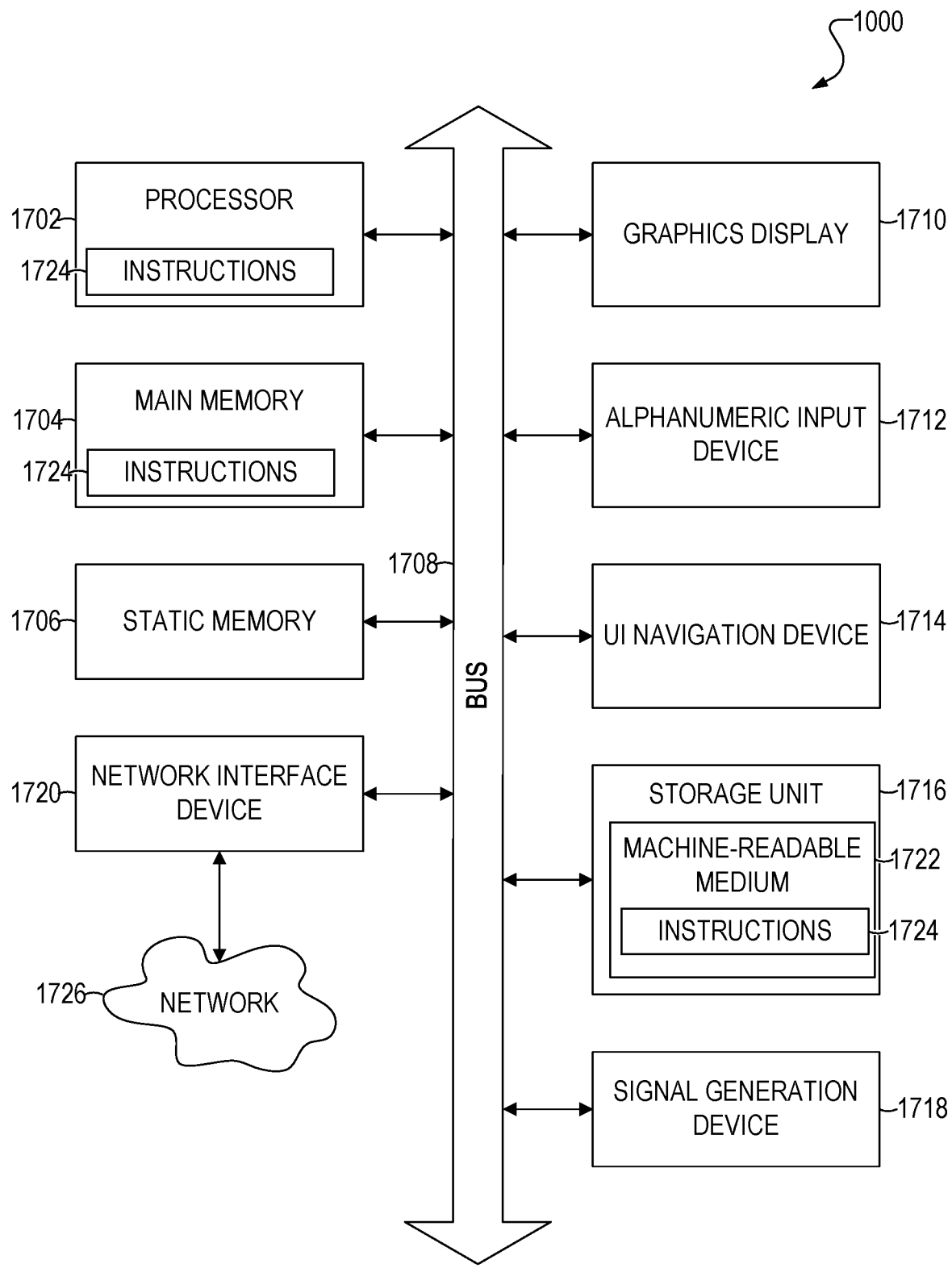
FIG. 10 is a block diagram of an example computer system on which methodologies and operations described herein may be executed, in accordance with example embodiments.

FIG. 10 is a block diagram of an example computer system 1000 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1702 (e.g., a central processing unit (CPU), a graphics processing unit (GPU) or both), a main memory 1704 and a static memory 1706, which communicate with each other via a bus 1708. The computer system 1000 may further include a graphics display unit 1710 (e.g., a liquid crystal display (LCD) or a cathode ray tube (CRT)). The computer system 1000 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1000, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more computer processors;
one or more computer memories;
a set of instructions incorporated into the one or more computer memories, the set of instructions configuring the one or more computer processors to perform operations, the operations comprising:
detecting an interaction with a messaging application, the interaction being usable for identifying a target for a new message from a plurality of possible targets for the new message, the interaction including a specification of one or more keywords associated with the target in a search portion of a user interface, the plurality of possible targets including individual connections associated with a member of a social networking system and titles of group conversations associated with the member of a social networking system;
applying a matching algorithm to the one or more keywords, the matching algorithm blending a ranking of the individual connections associated with the member with a ranking of the group conversations associated with the member, the ranking of the individual connections determined by a first ranking module, the first ranking module configured to rank each of the individual connections with respect to a likelihood that the member intends to send the new message to the individual connection, the ranking of the group conversation determined by a second ranking module, the second ranking module configured to rank each of the group conversations with respect to a likelihood that the member intends to send the new message for inclusion in the group conversation; and responsive to the detection of the interaction, causing a listing of identifiers associated with the targets to be presented in a search results portion of the user interface, each of the identifiers being selectable to cause a field to be presented in the user interface for entering the new message, the listing of the identifiers including names of the individual connections and the titles of the group conversations.

2. The system of claim 1, wherein the applying of the matching algorithm includes applying a machine-learned model to the group conversations, the machine-learned model using features pertaining to personalized engagement by the member with the group conversations, the features including one or more of conversation impressions by the member and messages sent to the group conversations by the member.

3. The system of claim 2, wherein the machine-learned model is generated based on a plurality of training data sources, the training data sources including one or more of a database of conversation views, a database of previous messages sent, and a database of connection strengths.

4. The system of claim 2, wherein the machine-learned model is selected from a plurality of machine-learned models based on one or more metrics, the one or more metrics including time to click, click-through rate, or distribution of click position.

5. The system of claim 1, wherein the applying of the matching algorithm includes applying a machine-learned model to the group conversations, the machine-learned model using features pertaining to relationships between the member and participants of the group conversations, the features including one or more of numbers of the participants in the group conversations and proportions of a first subset of the participants to a second subset of the participants, the first subset being connections of the member and the second subset being non-connections of the member.

6. The system of claim 1, wherein the applying of the matching algorithm includes applying a machine-learned model to the group conversations, the machine-learned model using features pertaining to general activity associated with the group conversations, the features including one or more of a total count of messages sent by participants in the group conversations and ages of the group conversations.

7. The system of claim 1, wherein the applying of the matching algorithm includes applying a machine-learned model to the group conversations, the machine-learned model using features pertaining to a context of the interaction, the features including one or more of fields to which the keywords are matched and classifications of activities of the member with respect to the group conversations.

8. The system of claim 7, wherein the fields include one or more of a field pertaining to a participant name and a field pertaining to a group conversation name.

9. The system of claim 7, wherein the interaction invokes a typeahead (TYAH) functionality in which each keystroke in the search portion triggers an update of the search results portion.

10. The system of claim 9, wherein the TYAH functionality is implementing with low latency based on accessing of an online key-value data store to identify search results for including in the updating of the search results portion.

11. A method comprising:
detecting an interaction with a messaging application, the interaction being usable for identifying a target for a new message from a plurality of possible targets for the new message, the interaction including a specification of one or more keywords associated with the target in a search portion of a user interface, the plurality of possible targets including individual connections associated with a member of a social networking system and titles of group conversations associated with the member of a social networking system;

applying a matching algorithm to the one or more keywords, the matching algorithm blending a ranking of the individual connections associated with the member with a ranking of the group conversations associated with the member, the ranking of the individual connections determined by a first ranking module, the first ranking module configured to rank each of the individual connections with respect to a likelihood that the member intends to send the new message to the individual connection, the ranking of the group conversation determined by a second ranking module, the second ranking module configured to rank each of the group conversations with respect to a likelihood that the member intends to send the new message for inclusion in the group conversation; and responsive to the detection of the interaction, causing a listing of identifiers associated with the targets to be presented in a search results portion of the user interface, each of the identifiers being selectable to cause a field to be presented in the user interface for entering the new message, the listing of the identifiers including names of the individual connections and the titles of the group conversations.

12. The method of claim 11, wherein the applying of the matching algorithm includes applying a machine-learned model to the group conversations, the machine-learned model using features pertaining to personalized engagement by the member with the group conversations, the features including one or more of conversation impressions by the member and messages sent to the group conversations by the member.

13. The method of claim 11, wherein the applying of the matching algorithm includes applying a machine-learned model to the group conversations, the machine-learned model using features pertaining to relationships between the member and participants of the group conversations, the features including one or more of numbers of the participants in the group conversations and proportions of a first subset of the participants to a second subset of the participants, the first subset being connections of the member and the second subset being non-connections of the member.

14. The method of claim 11, wherein the applying of the matching algorithm includes applying a machine-learned model to the group conversations, the machine-learned model using features pertaining to general activity associated with the group conversations, the features including one or more of a total count of messages sent by participants in the group conversations and ages of the group conversations.

15. The method of claim 11, wherein the applying of the matching algorithm includes applying a machine-learned model to the group conversations, the machine-learned model using features pertaining to a context of the interaction, the features including one or more of fields to which the keywords are matched and classifications of activities of the member with respect to the group conversations.

16. A non-transitory machine-readable storage medium embodying a set of instructions that, when executed by one or more processors, causes the one or more processors to perform operations, the operations comprising:
- detecting an interaction with a messaging application, the interaction being usable for identifying a target for a new message from a plurality of possible targets for the new message, the interaction including a specification of one or more keywords associated with the target in a search portion of a user interface, the plurality of possible targets including individual connections associated with a member of a social networking system and titles of group conversations associated with the member of a social networking system;
- applying a matching algorithm to the one or more keywords, the matching algorithm blending a ranking of the individual connections associated with the member with a ranking of the group conversations associated with the member, the ranking of the individual connections determined by a first ranking module, the first ranking module configured to rank each of the individual connections with respect to a likelihood that the member intends to send the new message to the individual connection, the ranking of the group conversation determined by a second ranking module, the second ranking module configured to rank each of the group conversations with respect to a likelihood that the member intends to send the new message for inclusion in the group conversation; and
- responsive to the detection of the interaction, causing a listing of identifiers associated with the targets to be presented in a search results portion of the user interface, each of the identifiers being selectable to cause a field to be presented in the user interface for entering the new message, the listing of the identifiers including names of the individual connections and the titles of the group conversations.

17. The non-transitory machine-readable storage medium of claim 16, wherein the applying of the matching algorithm includes applying a machine-learned model to the group conversations, the machine-learned model using features pertaining to personalized engagement by the member with the group conversations, the features including one or more of conversation impressions by the member and messages sent to the group conversations by the member.

18. The non-transitory machine-readable storage medium of claim 16, wherein the applying of the matching algorithm includes applying a machine-learned model to the group conversations, the machine-learned model using features pertaining to relationships between the member and participants of the group conversations, the features including one or more of numbers of the participants in the group conversations and proportions of a first subset of the participants to a second subset of the participants, the first subset being connections of the member and the second subset being non-connections of the member.

19. The non-transitory machine-readable storage medium of claim 16, wherein the applying of the matching algorithm includes applying a machine-learned model to the group conversations, the machine-learned model using features pertaining to general activity associated with the group conversations, the features including one or more of a total count of messages sent by participants in the group conversations and ages of the group conversations.

20. The non-transitory machine-readable storage medium of claim 16, wherein the applying of the matching algorithm includes applying a machine-learned model to the group conversations, the machine-learned model using features pertaining to a context of the interaction, the features including one or more of fields to which the keywords are matched and classifications of activities of the member with respect to the group conversations.

* * * * *